Aug. 14, 1945.　　　W. J. SYMONS　　　2,381,991
PROPELLER PITCH CONTROL
Filed April 26, 1940　　　4 Sheets-Sheet 3

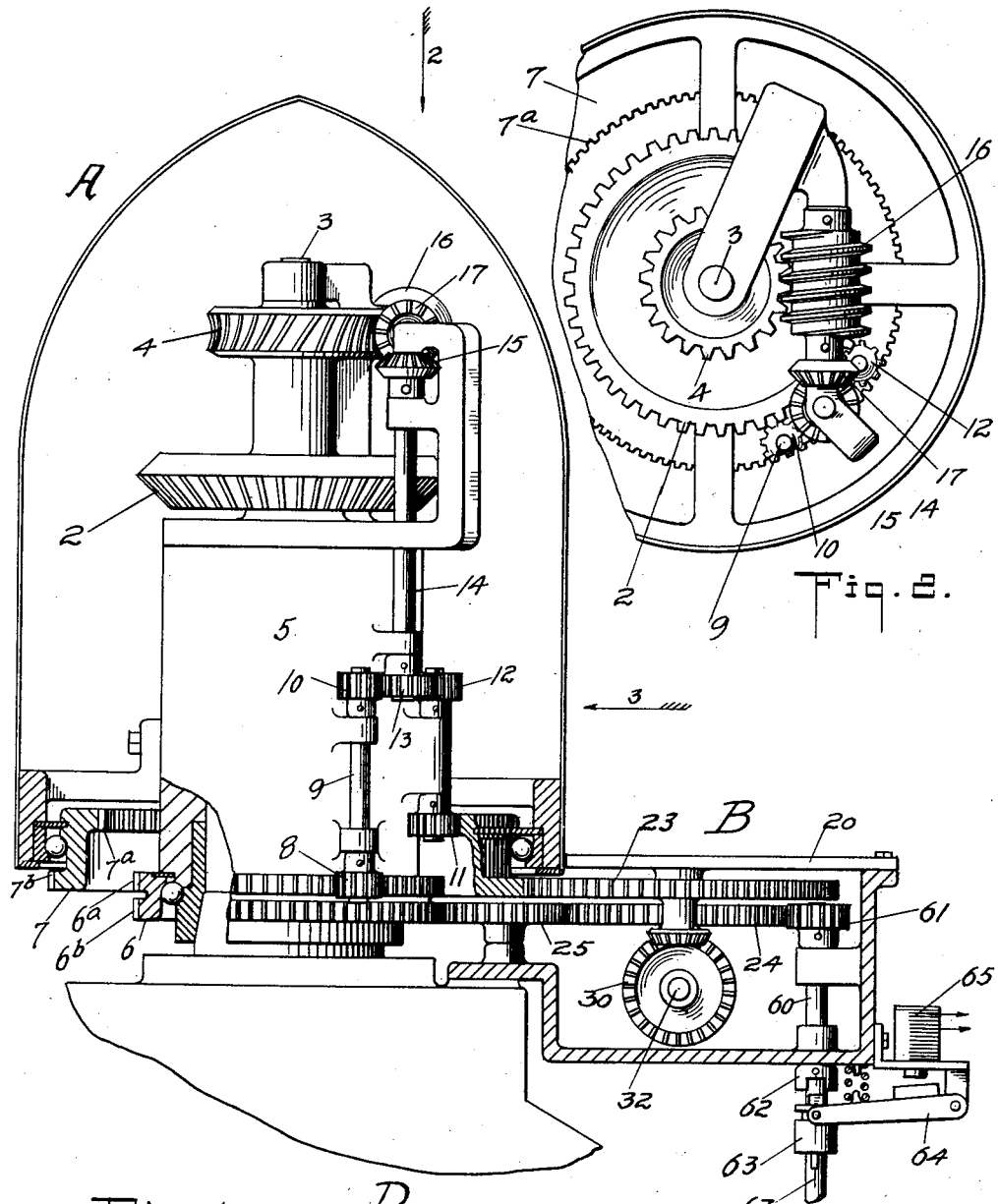

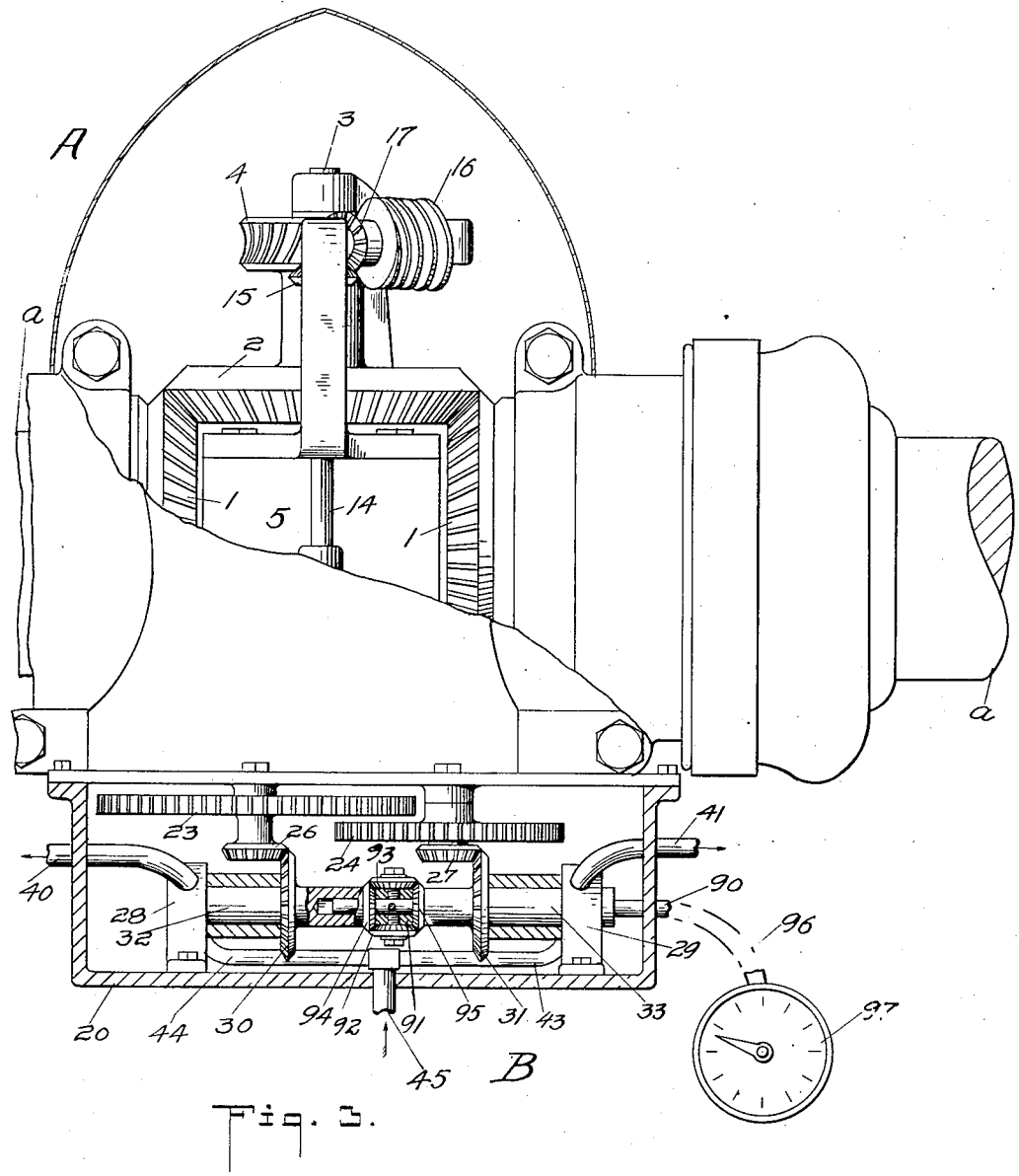

INVENTOR:
WM. J. SYMONS
BY O O Martin
ATTORNEY.

Aug. 14, 1945.  W. J. SYMONS  2,381,991
PROPELLER PITCH CONTROL
Filed April 26, 1940  4 Sheets-Sheet 4

INVENTOR:
WM. J. SYMONS
BY
O O Martin
ATTORNEY.

Patented Aug. 14, 1945

2,381,991

UNITED STATES PATENT OFFICE 2,381,991

PROPELLER PITCH CONTROL

William J. Symons, Van Nuys, Calif.

Application April 26, 1940, Serial No. 331,747

10 Claims. (Cl. 170—163)

My present invention relates to propellers and particularly to variable pitch airplane propellers.

Various devices have been developed for changing the pitch angle of propeller blades, some of which employ an outside source of power, such as an electric motor, to effect the necessary pitch angle variations. The difficulty in systems of this kind is that the electrical equipment used is relatively delicate and that the performance of the plane equipped therewith is dependent upon the proper and uninterrupted functioning thereof. A break or short circuit in the wiring not only will render the device inoperative but may even seriously affect the operation of the plane.

Others have proposed to provide gear connections between the engine shaft and the propeller blades and to cut clutches into these connections. In such systems, the full power is suddenly thrown against the propeller blades when a clutch is engaged but, obviously, the resulting movement is not gradual and smooth and the sudden strain on the gear connections is necessarily enormous.

The device of my invention is quite different from the prior art above referred to, as a perusal of the following description will show. It does not require power from any outside source for its operation, but is always directly connected to the engine shaft, nor is it fitted with clutches or other make and break controls, and it functions smoothly without excessive strain on any part thereof.

It is the principal object of the invention to provide, in an airplane having a variable pitch propeller, means responsive to variations in engine speed for automatically adjusting the propeller pitch relative to such variations of engine speed, independently of throttle adjustments, thereby to change the load of the propeller on the engine with a view to maintain uniform cruising speed of the engine.

It is a further object to provide manual means for modifying the operation of this automatic pitch varying mechanism in order to enable the pilot to change the normal cruising speed of the engine.

A further object is to provide manual means for changing the pitch of the propeller independently of said automatic pitch controlling means, thereby to enable the pilot of the plane to change the pitch at will, at any time while the engine is in motion.

Another object is the provision of means for changing the pitch of the propeller when the engine is not running.

A further object is the provision of means conveniently located on the instrument board of the plane to indicate the pitch of the propeller at all times.

A further object of the invention is to provide means as above outlined capable of effecting changes in the propeller pitch quickly, smoothly and without undue strain on the propeller mechanism.

A still further object is to provide safety devices designed to check overloading of the pitch changing mechanism thereby to safeguard against breakdown of the mechanism at any point and under any operating conditions.

A device in which the important features of the invention are embodied is hereinafter fully described, and this preferred form of the invention is illustrated in the appended drawings, of which:

Fig. 1 is a plan view, partly in section, of the portion of the device mounted on the engine block and on the end of the engine crank shaft;

Fig. 2 is an end view of a portion of Fig. 1, and is taken in the direction of the arrow 2, of Fig. 1;

Fig. 3 is a side elevation of the device of Fig. 1, taken substantially in the direction of the arrow 3 and with parts of the casing broken away in order to disclose the interior mechanism;

Figure 4:
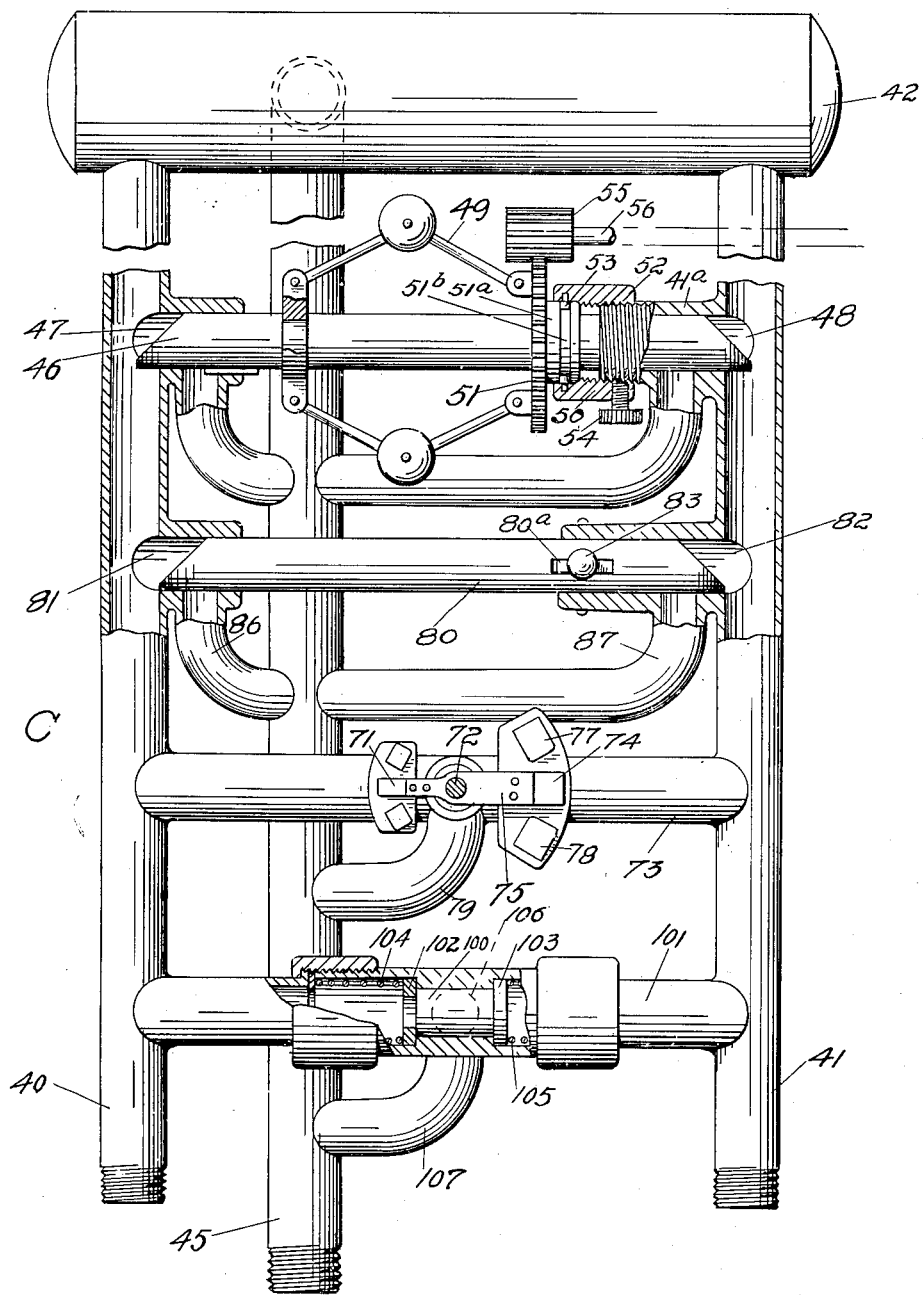
Fig. 4 is a general view of a control mechanism associated with the foregoing devices.

The mechanism illustrated in the drawings may, for convenience of description, be divided into three main groups, A, B, and C. The group A comprises the portion of the mechanism which is mounted to rotate with the propeller shaft; the group B is a pump mechanism mounted on a stationary part of the engine adjacent to group A; and group C is a mechanism for controlling the functioning of the pump group B. It is mounted in any desired position, preferably near the instrument board of the plane.

Taking up in the first instance the description of group A, attention is directed to bevel gears 1, one of which is affixed to the inner ends of each propeller blade A. These bevel gears are in constant mesh with a central bevel gear 2 of a short shaft 3, which latter carries a worm gear 4. A hub 5 is secured to the end of the engine shaft in any convenient, well known manner, and this hub is fitted to receive independently rotatable members 6 and 7. The member 6 is provided with external gear teeth 6ª, and a pinion 8, of a short shaft 9, which is suitably mounted on the hub 5, terminates in a gear wheel 10. The annular member 7 is shown provided with internal gear teeth 7ª, engaged by a pinion 11 of a second short shaft which terminates in a gear wheel 12. A gear wheel 13 is placed between and in mesh with the gears 10 and 12, and this gear is fastened to a shaft 14, which terminates in a bevel gear 15. The latter is, through a suitable bevel gear 17, fitted to rotate a worm 16 which, in turn, is in mesh with the worm wheel 4.

Let it be assumed for the purpose of this description that cruising speed of the engine constitutes the normal operating condition; that at this speed the pitch angle of the propeller is to remain unchanged; and that all of the aforenamed gears at cruising speed spin around with the propeller without relative rotation. It will now be explained how a change in the engine speed is effective automatically to start readjustment within the control group C and to set up movement in the various connections, presently to be described, resulting in relative axial rotation of all of the aforenamed trains of gears to change the pitch of the blades to correspond with the change in engine speed.

Turning for this purpose to group B, it is found that a casing 20 is mounted on a stationary part D of the engine block, and that this casing is fitted to receive a gear wheel 23, permanently in mesh with external teeth 7ᵇ of the annular member 7. Also that a second gear wheel 24, through the medium of an intermediate gear 25, is connected to rotate with external teeth 6ᵇ of the annular member 6, see also Fig. 3. It is important to note that the gears 23 and 24 are rotatable by the members 7 and 6 at the same speed but in the opposite directions.

Bevel gears 26 and 27 are shown secured to the gears 23 and 24, and they are permanently in mesh with bevel gears 30 and 31 of axially aligned shafts 32 and 33. These two sets of bevel gears must be of the same ratio in order that the two shafts normally may be rotatable at the same speed in the opposite direction. Two pumps 28 and 29, of equal capacity, are directly connected to the two shafts 32 and 33, freely to circulate a suitable fluid through conduits 40 and 41, a sealed container 42 and through pipe 45 to return conduits 43, 44, and 45 back to the pumps.

From the foregoing description, it should be clear that, while the propeller turns at normal speed, the gear trains of group A will spin around with the propeller without relative rotation, and that the gears of group B will be rotated by the members 6 and 7 to operate the pumps, at the same speed thereby to circulate the fluid through the container 42, but the pitch angle of the propeller blades will remain unchanged. It will now be described how a change in the propeller speed will influence the devices of group C to actuate the aforenamed mechanisms to modify the pitch angle.

A cylindrical stem 46 is transversely seated to slide in ports 47 and 48 of the conduits 40 and 41, and it is held in the central position shown in Fig. 4 during normal propeller cruising speed. A governor 49 is applied to this stem, substantially as shown, to induce axial movement of the latter in said ports to correspond with the propeller speed. It is seen that this governor will expand and contract in response to speed variations and, as one end thereof is anchored in a stationary bearing 50, it follows that the stem is made to move correspondingly. For the sake of simplicity, the connections to rotate the governor are merely shown to comprise an annular gear wheel 51, riding in a groove of the bearing 50 and joined to the arms of the governor. A pinion 55 meshes with this gear and it is, by means of a flexible shaft 56, suitably connected to be driven directly from the propeller shaft. In order to simplify the drawings, this connection is not herein illustrated. It is important to note that the position taken by the stem 46 and the governor in Fig. 4 represents the position at normal cruising speed.

Let it now be assumed that the propeller speed increases, and it is seen that the governor will expand and draw the stem further into the port 48, thereby to obstruct the flow of fluid therethrough. But as the opening through the port 47 is correspondingly enlarged, it is seen that less resistance is offered to the flow of fluid through this port. It is to be remembered that the annular members 6 and 7 are mounted for rotation on the propeller hub 5, and it is found that, because of their freedom of independent rotation, one will commence to rotate relative to the other, in response to the difference in resistance to the flow of the fluid through the conduits 40 and 41. It follows that the gear trains from the annular members also will rotate in opposite directions at the same speed to cause the bevel gear 2 to rotate and to turn the bevel gears 1, and, with them, the propeller blades, axially in their bearings, thereby to increase resistance to air pressure against the blades.

A careful study of the appended drawings will show that two continuous and unbroken chains of connections extend from the governor to the propeller blades. No clutches are present and all the gear wheels shown remain intermeshed at all times. It is further noted that the gear ratio gradually changes from relatively high speed to low speed at the propeller blades in order that very light pressure within the fluid system C may suffice to produce the power required to change the angular pitch of the blades. The system C may, for this reason, be made very small for convenient positioning at the instrument board of the plane without danger of the pressure within the system bursting the pipes thereof. When the gear wheels from the pumps 28, 29 to the propeller blades, as indicated, gradually increase in strength in proportion to the step by step changes in the gear ratio, no danger of stripping gear teeth is present. In other words, the mechanism of my invention is perfectly balanced throughout and operates smoothly without jar or shock.

As stated, the governor responds to variations in the engine speed, but such variations are relatively slowly effected and cushioned by the resilience of the fluid within the system C. The braking power applied to the trains of gears by this system is therefore not suddenly applied but increases gradually in strength to produce rapid and smooth pitch changes without sudden strain on any part of the device.

Referring now to Fig 3, it is noticed that the shafts 32 and 33 are hollow and that a shaft 90 is seated to rotate freely therein. A block 91 is secured to this shaft and it is fitted to support a pair of bevel gears 92 and 93, which latter are in mesh with similar gears of the shafts 32 and 33, respectively. The shaft 90 is, through the medium of a suitable flexible shaft 96, connected to operate an indicator 97, positioned within view of the airplane pilot. The shaft 90 remains unturned so long as the shafts 32 and 33 rotate at the same speed, but is itself rotated in response to relative speed variations of the former, thereby to indicate on the dial 97 the angular pitch of the propeller blades at all times.

Automatic means of adjusting the pitch of the blades is in this manner obtained, and because the mechanism derives its motive power directly from the propeller shaft, it will function positively and smoothly while the engine is running. There are times, however, while the engine is not running, when it may be found very important to be able to change the propeller pitch, as for instance before the engine is started, at which time the least resistance to the starting movement is essential. Also, in case the engine stalls in flight and cannot again be started, it may be found most important to be able to move the blades into position of least resistance to air pressure, thus preventing a wind-mill action causing rotation of the engine, in which position the tendency on the part of wind pressure to turn the blades in their bearings also is substantially eliminated. Means capable of effecting such pitch angle adjustment will now be described.

Figure 7:
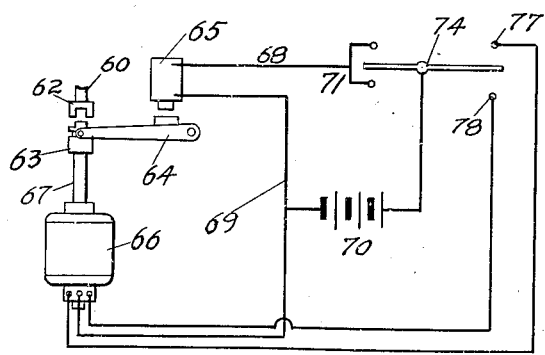
Fig. 7 is a diagrammatic view of the electrical control of the device.

In Fig. 1, within the pump casing 20, is shown mounted a shaft 60, carrying a gear 61, and the latter is shown permanently in mesh with the gear 24. A clutch member 62 of this shaft is positioned for engagement by a second clutch member 63, and the latter is for this purpose movable by an arm 64, controlled by an electro magnet 65. A motor 66 is, in Fig. 7, shown mounted in axial alignment with the shaft 60 and the clutch member 63 is splined to the motor shaft 67 for axial movement thereon. Conductors 68 and 69 extend from the magnet 65, through a source of electric energy 70 and a switch 71. This switch is operated, as will be explained presently, to close the circuit through this magnet and thereby to actuate the clutch to interconnect the shafts 60 and 67.

Figure 5:
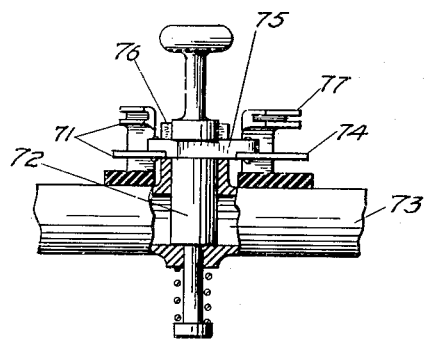
Figs. 5 and 6 are detail views of parts of Fig. 4.

The switch 71 forms part of a mechanism controlling a valve 72 of a duct 73, which latter interconects the conduits 40 and 41. A contact member 74 is fastened to an arm 75 of this valve and insulated therefrom, and this arm is shown riding in a slot 76 of the valve casing, see also Fig. 5. In order to operate this valve to open the duct 73, it is necessary manually to move the stem axially until the arm 75 rises out of the slot 76, whereupon the stem may be rotated to swing the contact member 74 into engagement with a clip 77 or 78. The motor 66 is of the reversible type and it is caused to rotate one way or the other as the motor circuit is closed through one of the said clips or the other.

When the airplane engine is started and while this valve remains open, it is seen that the fluid may flow freely from the pumps through the ducts 40, 41, 73, a duct 79 and the return duct 45 back to the pumps. It is further noticed that rotation of the motor 66, in one direction or the other, operates through the closed clutch to rotate the gear 24 correspondingly, thereby to initiate the relative rotation of the annular members 6 and 7 and in turn to change the pitch of the propeller blades in one direction or the other, as may be desired by the airplane pilot. When the valve again is closed, it is seen that the automatic control again becomes effective to regulate the engine speed through the medium of the aforenamed trains of gears.

It was above stated that the governor is anchored in a stationary bearing 50. It is now noted, however, that the gear wheel 51 is made axially adjustable in its bearing in order to enable the pilot to modify the axial relation of the stem 46 to the governor and to the ports 47 and 48. This enables the pilot to effect a change in the constant, governor controlled speed, whenever such change is considered necessary or advisable. To this end, the gear 51 is shown forming part of a sleeve 51ª, which rides on the stem 46 and is made with a groove 51ᵇ. An internally threaded nut 52 is seated on screwthreads of a hub 41ª of the conduit 41, and it is made with the studs 53 riding in the groove 51ᵇ. A set screw 54 serves to lock the nut in adjusted position.

The foregoing is illustrative of means for effecting automatic control of the engine speed independently of throttle adjustments, but the pilot is, of course, free to adjust the throttle to any engine speed which he may wish to obtain, and he is free manually to adjust the governor so as to modify the position of the stem 46 relative to the ports 47 and 48 of the conduits to correspond with the desired throttle adjustment, should he find such adjustment preferable.

Figure 6:
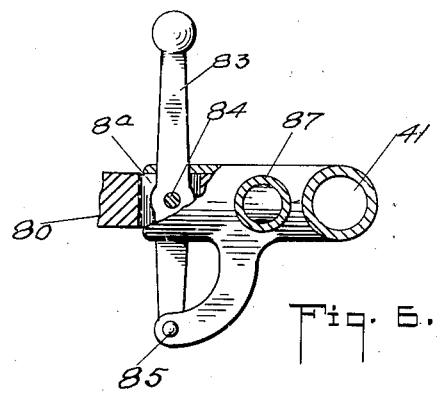

Under certain conditions, it may be found very essential to be able to change the propeller pitch quickly, independently of the automatic control above described. To this end, I have provided a manual fluid flow control comprising a stem 80, seated in conduit ports 81 and 82 of the ducts 40 and 41. A lever 83 is seated in a slot 80ª of this stem, and it is pivotally secured thereto at 84, see also Fig. 6. The lower end of this lever is journaled below the stem, at 84, and it may be manually swung on this fulcrum to open a passage through conduit 86 or 87 to the return conduit 45, and at the same time to close the conduit on the side opposite to the passage which is opened.

In a device of the character described, it is, of course, necessary to provide such safety devices as modern engineering practice may demand, but it is not thought necessary to burden the description with recital of such devices or to complicate the drawings with illustrations thereof, except to indicate means for preventing possibility of damage caused by overloading of pressure within the fluid circulating system. Such means is illustrated in Fig. 4 to comprise a plunger 100, seated to slide in a passage 101, which latter interconnects the conduits 40 and 41. Annular glands 102 and 103 are by means of springs 104 and 105 provided yieldingly to maintain this plunger in the central position indicated in the drawings. Should the pressure within one of the conduits 40 and 41 become so great as to endanger the mechanism, it is seen that the plunger is movable in the opposite direction to uncover a port 106 of a passage 107 to the return conduit 45.

I wish it clearly understood that the drawings merely illustrate such simple means of attaining the desired results as will be required for the guidance of a competent designing engineer, who will embody in the design every device recognized in present day airplane construction as necessary for the purposes of the invention.

It should also be mentioned for the guidance of the designer that the single chain of gears from the ring gears 6 and 7 to the worm gear 4 would leave the propeller in an unbalanced condition and that, for this reason, a second train of identical gears should be installed diametrically opposite to the gears shown. Because such second train of gears would render the drawings difficult to read, they have not been illustrated.

Other modifications may be embodied within the scope of the appended claims.

I claim:

1. In an airplane having an engine crank shaft and blades mounted thereon for axial rotation, a gear mechanism extending from said blades to rotate as a whole with said shaft, a fluid circulating system having two branches, a pump in each branch, a gear system positively driven by said gear mechanism to operate said pumps, means responsive to engine speed variations to check the flow though one branch thereby to check the speed of the pump thereof and in turn through said gear system to set relative rotation of gears in said gear mechanism, a conduit interconnecting said branches, a normally closed valve in said conduit, a two-way electric motor operatively connected to rotate said gear system, and switch means actuated upon manual opening rotation of said valve to close a circuit through said motor to start the latter in one direction or the other according to the direction of rotation of the valve.

2. In an airplane having an engine crank shaft and blades mounted for axial rotation thereon, gear means extending from said blades, a fluid system having two branches, a pump in each branch, said pumps being directly operated by said gear means, means responsive to engine speed variations to check the flow through one of said branches thereby to check the speed of the pump thereof, a conduit interconnecting said branches and having a relief port, and a plunger in said conduit normally maintaining said port closed and movable by excess pressure in one of said branches to uncover said relief port.

3. In an airplane having propeller blades mounted for axial rotation, gear means for rotating said blades, a pair of pumps driven by said gear means, a fluid pressure system comprising, a storage tank, conduits leading from said pumps to the said tank, said conduits having two sets of opposed ports, a return pipe from the tank to the pumps, relief passages from the said ports to the said return pipe, a plunger seated in two of said opposed ports, an engine driven governor operatively connected to slide said plunger in said ports to check the flow through one conduit and simultaneously to open a passage through the relief passage of the opposite port, a manually slidable plunger seated in the second set of said opposed ports to check the flow through one conduit and to open a passage through the relief passage of the opposite port, a tube interconnecting said conduits and having a relief passage to the return pipe, a manually rotatable valve controlling the last named relief passage, a reversible electric motor operatively connected to rotate said gear means, switch means on said valve actuated upon rotation thereof to close a circuit through said motor upon opening said relief passage, thereby to set up rotations within said gear means in one direction or the other depending upon the direction of rotation of said valve, a second conduit interconnecting tube having a relief passage, and a plunger in said second tube normally closing said passage, said plunger being slidable by excessive pressure in one of the conduits to open said relief valve.

4. In an airplane having propeller blades mounted for axial rotation, gear means for so rotating said blades, a pair of pumps driven by said gear means, a fluid pressure system comprising, a storage tank, conduits leading from said pumps to said tank, means responsive to engine speed variations to check the flow through one of said conduits thereby to check the speed of the pump thereof, a return pipe from the tank to said pumps, opposed ports in said conduits, relief passages from said ports to the said return pipe, a plunger seated in said ports, and means adapted manually to slide said plunger thereby to check the flow through one of the conduits and simultaneously to open the relief passage from the opposite port to the return pipe and so to render said flow control by the said engine variation responsive means inoperative, and means operatively interconnecting the fluid pressure system with the said gear means.

5. In an airplane having an engine crank shaft and propeller blades mounted thereon for axial rotation to change the pitch thereof, a gear mechanism extending from said blades to rotate as a whole with said shaft, a fluid circulating system comprising, two pumps operatively connected for rotation by said gear mechanism, a storage tank, a branch leading from each pump to said tank, a return conduit from the tank to the pumps, means responsive to engine speed variations to check the flow through one branch or the other thereby to check the speed of the pump affected thereby and in turn through said gear mechanism axially to turn the propeller blades, a tubular member interconnecting said branches, a passage from said member to the return conduit, a plunger in the member, resilient means maintaining said plunger in position normally to close said passage, excess pressure within one branch or the other causing said plunger to move axially against the tension of said resilient means to open said passage thereby to relieve such excess pressure.

6. In an airplane having an engine crank shaft and propeller blades mounted thereon for axial rotation to change the pitch thereof, a gear mechanism extending from said blades, two pumps operatively connected for rotation by said gear mechanism, a storage tank, a fluid circulating system having two branches leading from the pumps to said tank, a return conduit from the tank to the pumps, means responsive to engine speed variations to check the flow through one branch or the other thereby to check the speed of the pump thereof and in turn through said gear mechanism to rotate said blades axially, opposed ports in said branches, a passage from each port to said return conduit, and a valve stem seated in said ports normally to maintain said passages closed, said stem being manually movable axially to open one port passage or the other.

7. In combination with the propeller blades of an airplane, a fluid control system including two pumps having axially alined shafts, gear connections extending from said blades to the said shafts normally to drive the two pumps at the same speed, means driven from the engine for controlling the flow through said system thereby to effect speed variations in the two pumps corresponding to engine speed variations, and in turn through said gear connections to change the propeller pitch correspondingly, a pitch angle indicator at the pilot's station, and means operatively interconnecting the adjoining ends of said pump shafts with the said indicator for indicating thereon the pitch angle changes which follow such relative pump speed variations.

8. In combination with the propeller blades of an airplane, a fluid control system including two pumps having axially alined shafts, gear connections from said blades to said shafts normally to drive the pumps at the same speed, means driven from the engine for controlling the flow through said system thereby to effect speed variations in the two pumps corresponding to engine speed variations and in turn through said gear connections to change the pitch of the propeller blades correspondingly, a pitch angle indicator at the pilot's station having a shaft leading to the adjoining ends of the pump shafts, a differential gear mechanism operatively interconnecting the adjoining ends of the pump shafts with the said indicator shaft to change the indicator setting to correspond with the relative pump speed variations.

9. In combination with the propeller blades of an airplane, a fluid control system including two pumps, a storage tank, conduits leading from said pumps to the said tank, a return conduit from the latter to the pumps, gear connections from the propeller blades normally to rotate said pumps at the same speed thereby to circulate fluid through the system, engine driven means for automatically varying the flow through the system in response to engine speed variations thereby relatively to vary the speed of the pumps and in turn to vary the propeller pitch, a by-pass from said conduits to said return conduit, and means for manually controlling said by-pass thereby through said gear connections to effect changes in the propeller pitch without affecting the operation of said automatic engine driven pitch changing means.

10. In combination with the propeller blades of an airplane, a fluid control system including two pumps, a storage tank, conduits leading from the pumps to the said tank, a return conduit from the latter to the pumps, gear connections from the propeller blades normally to rotate said pumps at the same speed thereby to circulate fluid through the system, engine driven means for automatically varying the flow through the system in response to engine speed variations thereby relatively to vary the speed of the pumps and in turn to vary the propeller pitch, a by-pass from said conduit to the said return conduit, a floating valve within said by-pass normally closing the passage to the return conduit, and resilient means normally maintaining the valve in closing position, excess pressure within one of said two conduits forcing the valve to move axially and to open a passage therefrom to the return conduit thereby to relieve the excess pressure without thereby affecting the operation of the engine driven automatic fluid control means.

WILLIAM J. SYMONS.